United States Patent
Ezrielev et al.

(10) Patent No.: US 12,411,679 B2
(45) Date of Patent: Sep. 9, 2025

(54) SYSTEM AND METHOD FOR MANAGING A CACHE HOSTED BY A DATA PROCESSING SYSTEM USING A DIGITAL TWIN

(71) Applicant: Dell Products L.P., Round Rock, TX (US)

(72) Inventors: Ofir Ezrielev, Be'er Sheva (IL); Tomer Kushnir, Omer (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 205 days.

(21) Appl. No.: 18/309,147

(22) Filed: Apr. 28, 2023

(65) Prior Publication Data

US 2024/0362010 A1    Oct. 31, 2024

(51) Int. Cl.
*G06F 8/65* (2018.01)
*G06N 5/02* (2023.01)

(52) U.S. Cl.
CPC .................. *G06F 8/65* (2013.01); *G06N 5/02* (2013.01)

(58) Field of Classification Search
USPC ........................................................ 717/168
See application file for complete search history.

(56) References Cited

U.S. PATENT DOCUMENTS

| | | | |
|---|---|---|---|
| 7,159,210 B2 | 1/2007 | Griffin | |
| 7,480,827 B2 | 1/2009 | Callaway | |
| 7,725,764 B2 | 5/2010 | Morosan | |
| 7,908,653 B2 | 3/2011 | Brickell | |
| 8,060,442 B1 | 11/2011 | Hecht | |
| 10,325,102 B2 | 6/2019 | AthuluruTlrumala | |
| 10,540,960 B1 | 1/2020 | Jones | |
| 11,334,471 B1 | 5/2022 | Stocker | |

(Continued)

FOREIGN PATENT DOCUMENTS

WO    2022101656 A1    5/2022

OTHER PUBLICATIONS

Almasan, Paul, et al. "Digital twin network: Opportunities and challenges." arXiv preprint arXiv:2201.01144 (2022). (7 Pages).

(Continued)

*Primary Examiner* — Yuqing Xiao
*Assistant Examiner* — Clint Thatcher
(74) *Attorney, Agent, or Firm* — WOMBLE BOND DICKINSON (US) LLP

(57) ABSTRACT

Methods and systems for managing operation of data processing systems with limited access to an uplink pathway are disclosed. To manage the operation, a system may include a data processing system manager, a data collector, and one or more data processing systems. The data processing system manager may identify future events that may impact operation of the data processing system using a digital twin and observational data. A cache hosted by the data processing system may store events and commands associated with the events. The commands may include action sets intended to mitigate impacts of the events. If the data processing system does not have commands associated with the simulated future events stored in the cache, the data processing system manager may provide instructions for replacing at least a portion of the commands stored in the cache with commands responsive to the simulated future events.

20 Claims, 9 Drawing Sheets

(56) References Cited

U.S. PATENT DOCUMENTS

| | | | |
|---|---|---|---|
| 11,733,908 B2 | 8/2023 | Sun | |
| 2008/0016339 A1 | 1/2008 | Shukla | |
| 2008/0282345 A1 | 11/2008 | Beals | |
| 2009/0106255 A1 | 4/2009 | Lacapra | |
| 2010/0031308 A1 | 2/2010 | Khalid | |
| 2013/0152047 A1 | 6/2013 | Moorthi | |
| 2015/0026767 A1 | 1/2015 | Sweet | |
| 2015/0046125 A1* | 2/2015 | Jagiella | G01M 99/008 702/184 |
| 2015/0089502 A1 | 3/2015 | Horovitz | |
| 2016/0308895 A1 | 10/2016 | Kotler | |
| 2017/0060975 A1 | 3/2017 | Akyureklier | |
| 2019/0173919 A1 | 6/2019 | Irimie | |
| 2019/0213104 A1 | 7/2019 | Qadri | |
| 2020/0048866 A1* | 2/2020 | Weber | E02F 9/205 |
| 2020/0081445 A1* | 3/2020 | Stetson | G05D 1/0221 |
| 2020/0092322 A1 | 3/2020 | Boss | |
| 2020/0411168 A1* | 12/2020 | Thomas | G06Q 10/06311 |
| 2021/0097186 A1 | 4/2021 | Mandal | |
| 2021/0211438 A1 | 7/2021 | Trim | |
| 2021/0248229 A1 | 8/2021 | Kras | |
| 2021/0374032 A1 | 12/2021 | Rakshit | |
| 2022/0137611 A1 | 5/2022 | Naito | |
| 2022/0253534 A1 | 8/2022 | Biswas | |
| 2022/0299988 A1* | 9/2022 | Nair | B60W 30/184 |
| 2022/0327476 A1* | 10/2022 | Shanmugavelayudam | G06Q 10/0832 |
| 2023/0367911 A1 | 11/2023 | Balber | |
| 2024/0003242 A1* | 1/2024 | Ambade | E21B 47/008 |
| 2024/0077867 A1* | 3/2024 | Mene | G05B 23/0283 |
| 2024/0177067 A1* | 5/2024 | Ezrielev | G06N 20/20 |
| 2024/0273411 A1 | 8/2024 | Mueck | |
| 2024/0348664 A1 | 10/2024 | Mohanram | |
| 2024/0354657 A1* | 10/2024 | Li | G06N 20/00 |

OTHER PUBLICATIONS

Hu, Weifei, et al. "Digital twin: A state-of-the-art review of its enabling technologies, applications and challenges." Journal of Intelligent Manufacturing and Special Equipment 2.1 (2021): 1-34. (34 Pages).

Khan, Latif U., et al. "Digital-twin-enabled 6G: Vision, architectural trends, and future directions." IEEE Communications Magazine 60.1 (2022): 74-80. (7 Pages).

Nguyen, Huan X., et al. "Digital twin for 5G and beyond." IEEE Communications Magazine 59.2 (2021): 10-15. (13 Pages).

Wang, Danshi, et al. "The role of digital twin in optical communication: fault management, hardware configuration, and transmission simulation." IEEE Communications Magazine 59.1 (2021): 133-139. (6 Pages).

Pang, Toh Yen, et al. "Developing a digital twin and digital thread framework for an 'Industry 4.0' Shipyard." Applied Sciences 11.3 (2021): 1097. (22 Pages).

Isto, Pekka, et al. "5G based machine remote operation development utilizing digital twin." Open Engineering 10.1 (2020): 265-272. (8 Pages).

Rovira-Sugranes, Arnau, et al. "A review of AI-enabled routing protocols for UAV networks: Trends, challenges, and future outlook." Ad Hoc Networks 130 (2022): 102790. (30 Pages).

* cited by examiner

Results 416

| Operating Condition | Command |
|---|---|
| A | Perform action E |
| B | Perform action F |
| C | Perform action G |
| D | Perform action H |

Copy of Cache 418

| Operating Condition | Command |
|---|---|
| D | Perform action H |
| J | Perform action M |
| K | Perform action N |
| L | Perform action O |

Threshold 420:
75% similarity between records

Instructions 422:
Delete records for J, K, and L
Add records for A, B, and C

Updated Cache 424

| Operating Condition | Command |
|---|---|
| D | Perform action H |
| A | Perform action E |
| B | Perform action F |
| C | Perform action G |

FIG. 4C

SYSTEM AND METHOD FOR MANAGING A CACHE HOSTED BY A DATA PROCESSING SYSTEM USING A DIGITAL TWIN

FIELD

Embodiments disclosed herein relate generally to managing events impacting operation of data processing systems throughout a distributed environment. More particularly, embodiments disclosed herein relate to systems and methods for managing a cache hosted by a data processing system, the cache storing action sets intended to mitigate impacts of events occurring during operation of the data processing system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 4A-4C show block diagrams illustrating a system in accordance with an embodiment over time.

DETAILED DESCRIPTION

Figure 1:
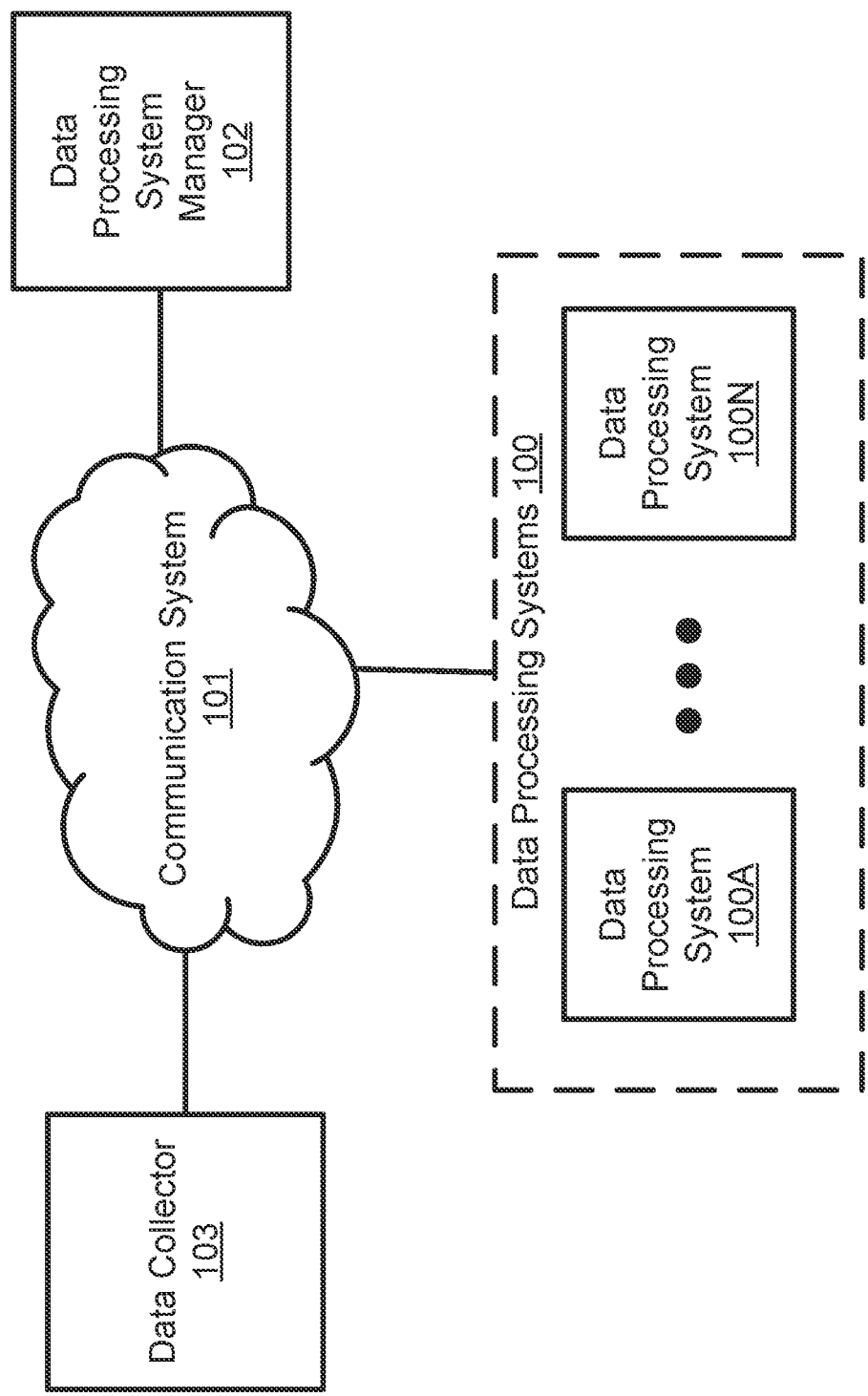
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing operation of a data processing system with limited access to an uplink communication pathway. Data processing systems throughout a distributed environment may be positioned in remote locations and, to conserve computing resources and communication system bandwidth, may consume limited computing resources during operation and/or may have limited (or no) access to an uplink pathway (e.g., a communication system pathway allowing data transmissions from the data processing system to other entities in the system).

The data processing system may be responsible for facilitating computer-implemented services provided by the system. During operation, the data processing system may encounter events that may impact the operation of the data processing system (e.g., depart from nominal performance of the data processing system). Due to the limited computing resources available to perform computations, the data processing system may not be capable of identifying potential actions to mitigate the impact of the events. In addition, the lack of access to the uplink pathway may make it infeasible and/or impossible for the data processing system to query another entity for assistance.

To mitigate the impact of the events causing non-nominal operation of the data processing system (and/or to prevent the events) while conserving computing resources and network bandwidth, the system may include a data processing system manager. The data processing system manager may obtain observational data from a data collector positioned remote to the data processing system via a pathway that is not the uplink pathway. The data collector may observe operation of the data processing system and the environment the data processing system is positioned in and may provide the observational data to the data processing system manager.

Without obtaining any data directly from the data processing system, the data processing system manager may host and operate a digital twin of the data processing system. Using at least the observational data, the digital twin may simulate operation of the data processing system under conditions representative of the environment in which the data processing system operates (e.g., via the conditions observed by the data collector). Analysis of the simulated operation may allow the data processing system manager to identify potential future occurrences of events that may impact the operation of the data processing system.

In response to the identified potential future occurrences of the events, actions intended to prevent and/or remediate the impact of the events may be identified. The data processing system manager may provide commands (e.g., commands to perform the actions when certain operational conditions arise and/or other commands) to the data processing system via a downlink pathway.

However, in addition to having limited (or no) access to the uplink pathway, the data processing system may have limited storage capabilities (e.g., a finite amount of storage capacity in a cache hosted by the data processing system). Therefore, the data processing system may not be able to store all commands generated and provided by the data processing system manager over time. In addition, some commands may age out of relevance due to changing environmental and/or operational conditions of the data processing system. Continuing to store aged out commands may be an inefficient use of the limited storage capacity of the data processing system.

To ensure relevant commands are available to the data processing system, the data processing system manager may manage the cache. To manage the cache, the data processing system manager may maintain a copy of the cache and may determine whether recently identified commands (e.g., those responsive to likely future occurrences of events based on recent observational data and/or other commands) match commands currently stored in the copy of the cache (to an extend considered acceptable via comparison to a threshold). If enough (e.g., based on the threshold) of the recently identified commands are already stored in the copy of the cache, no action may be necessary. If enough of the recently identified commands are not already stored in the copy of the cache, the data processing system manager may provide instructions for the data processing system to update the cache (e.g., via deleting some commands and storing new commands, etc.).

Thus, data processing systems with limited available computing resources, limited storage capacities, and/or limited (or no) access to an uplink pathway may be provided with instructions to alleviate impacts of likely future events on operation of the data processing system. By collecting observational data from a data collector positioned to observe the data processing system and simulating operation of the data processing system using a digital twin, the instructions may be generated without increasing computing resource and/or network bandwidth consumption by the data processing system. The data processing system manager may determine which commands are most likely to be relevant to future operation of the data processing system and may manage which commands are stored in the cache over time to meet the future needs of the data processing system.

In an embodiment, a method of managing a data processing system with limited access to an uplink pathway by a data processing system manager is provided. The method may include: obtaining likely future operating conditions for the data processing system based at least on first observational data for the data processing system, the first observational data indicating environmental conditions encountered by the data processing system during a first duration of time; identifying a first set of commands using at least the likely future operating conditions and a command repository, the first set of commands comprising actions responsive to a first range of operating conditions that comprises the likely future operating conditions, and content of the command repository being based on a digital twin for the data processing system and a third range of operating conditions; making a determination regarding whether the first range of the operating conditions matches a second range of operating conditions to which a second set of commands stored in a cache of the data processing system is responsive within a threshold; in a first instance of the determination in which the first range of the operating conditions does not match the second range of the operating conditions within the threshold: obtaining an update for the data processing system based on a delta between the first range of the operating conditions and the second range of the operating conditions; updating the cache based on the update.

The observational data may be obtained from a data collector, the data collector being located remote to the data processing system and being capable of transmitting the observational data via a different pathway from the uplink pathway.

The method may also include: prior to obtaining the likely future operating conditions: generating the command repository using the digital twin, the digital twin being intended to duplicate operation of the data processing system.

Generating the command repository may include: obtaining the third range of the operating conditions based at least on second observational data; simulating operation of the data processing system using the third range of the operating conditions and the digital twin; identifying, based on the simulated operation, future occurrences of events that are likely to occur and that will impact the operation of the data processing system; selecting a command for performance by the data processing system for each future event of the future occurrences of the events, the command being expected to mitigate impact of the future occurrences of the events when performed by the data processing system; generating a record associated with each command, the record comprising the command and the operating conditions associated with the command; and populating the command repository with the records.

The command repository may be updated as additional future occurrences of events that are likely to occur and that will impact the operation of the data processing system are identified using the digital twin.

The third range of the operating conditions may include all of the operating conditions in the command repository.

The operating conditions of the third range of the operating conditions may be simulated using the digital twin and the command repository may include pre-defined actions responsive to each operating condition of the third range of the operating conditions.

The threshold may be based on historic data related to a rate of change of the operating conditions of the data processing system over time.

The threshold may indicate an acceptable offset between the first set of the operating conditions and the second set of the operating conditions, and a magnitude of the offset may be dependent on a capacity of the cache.

Obtaining the update may include: identifying a subset of the second set of the commands based on the delta; identifying at least a portion of the first set of the commands based on the delta; generating an instruction to: remove records associated with the subset of the second set of the commands from the cache; and add records associated with the at least the portion of the first set of the commands to the cache.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer-implemented services may include any type and quantity of computer-implemented services. For example, the computer-implemented services may include monitoring services (e.g., of locations), communication services, and/or any other type of computer-implemented services.

To provide the computer-implemented services, the system may include data processing system manager 102. Data processing system manager 102 may provide all, or a portion of, the computer-implemented services. For example, data processing system manager 102 may provide computer-implemented services to users of data processing system manager 102 and/or other computing devices operably connected to data processing system manager 102.

To facilitate performance of the computer-implemented services, the system may include one or more data processing systems 100. Data processing systems 100 may include any number of data processing systems (e.g., 100A-100N). For example, data processing systems 100 may include one data processing system (e.g., 100A) or multiple data processing systems (e.g., 100A-100N) that may independently and/or cooperatively facilitate the computer-implemented services.

All, or a portion, of data processing systems 100 may provide (and/or participate in and/or support the) computer-implemented services to various computing devices operably connected to data processing systems 100. Different data processing systems may provide similar and/or different computer-implemented services.

To facilitate performance of the computer-implemented services, the system may include data collector 103. Data collector 103 may include any number of data collectors (one data collector, multiple data collectors, etc.) that may provide (and/or participate in and/or support the) computer-implemented services to various computing devices operably connected to data collector 103.

When providing the computer-implemented services, the system of FIG. 1 may monitor events impacting operation of data processing systems throughout a distributed environment. Data processing systems 100 may be positioned in remote locations, may have limited computing resources available to run computations, and may have little (or no) access to an uplink communication pathway (through which to transmit data to data processing system manager 102, data collector 103, and/or any other entity).

However, a data processing system (e.g., data processing system 100A) may encounter an event that impacts the operation of the data processing system (e.g., by causing non-nominal operation). Due to the lack of computing capabilities, the data processing system may not be capable of learning how to remediate the impact of the event and/or prevent future occurrences of the event. In addition, the data processing system may be incapable of querying data processing system manager 102 (and/or any other entity) for a potential solution due to the lack of uplink pathway access.

In general, embodiments disclosed herein may provide methods, systems, and/or devices for mitigating impacts of occurrences of events during operation of a data processing system. To do so, the system of FIG. 1 may obtain observational data for an environment in which the data processing system is located. Operation of the data processing system may be simulated using at least the observational data and a digital twin of the data processing system. The simulated operation of the data processing system may reveal potential future occurrences of events that are likely to occur and that may impact the operation of the data processing system.

In response to identifying the potential future occurrences of the events, the system of FIG. 1 may identify commands expected to mitigate impacts of the events when performed by the data processing system and/or other commands. The system of FIG. 1 may provide the commands to the data processing system via an available downlink pathway.

However, the data processing system may have limited storage capacity to maintain commands in a cache. Rather than providing all commands to the data processing system as they are identified, the data processing system manager may manage the contents of the cache by determining which commands are most likely to be relevant to future operation of the data processing system. The data processing system manager may maintain a copy of the cache hosted by the data processing system and may determine whether the cache currently contains a sufficient (e.g., based on a threshold) quantity of the likely relevant commands.

The data processing system manager may provide the recently identified commands to the data processing system if the recently identified commands do not match the contents of the copy of the cache within a threshold. By doing so, the data processing system may be more likely to have access to commands relevant to future occurrences of events impacting the operation of the data processing system.

To provide the above noted functionality, the system of FIG. 1 may include data processing system manager 102. Data processing system manager 102 may: (i) obtain likely future operating conditions for the data processing system, (ii) identify a first set of commands using at least the likely future operating conditions and a command repository, and/or (iii) determine whether a first range of operating conditions associated with the first set of the commands matches a second range of the operating conditions to which a second set of commands stored in a cache of the data processing system are responsive within a threshold. If the first range does not match the second range within the threshold, data processing system manager 102 may: (i) obtain an update for the data processing system based on a delta between the first range and the second range and/or (ii) update the cache based on the update.

When performing its functionality, data processing system manager 102, data collector 103, and/or data processing systems 100 may perform all, or a portion, of the methods and/or actions shown in FIGS. 2A-3B.

Data processing systems 100, data collector 103, and/or data processing system manager 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of data processing systems 100, data collector 103, and/or data processing system manager 102 are implemented using an internet of things (IoT) device, which may include a computing device. The IoT device may operate in accordance with a communication model and/or management model known to data processing system manager 102, data collector 103, other data processing systems, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 101 may include any number of communication pathways (e.g., channels for transmissions to be sent and received), some of which may be accessible to different components of the system of FIG. 1. For example, communication system 101 may include an uplink pathway over which data may be transmitted from data processing systems 100 to data processing system manager 102. Use of the uplink pathway by data processing systems 100 may consume energy and network bandwidth and, therefore, may be undesirable. Data processing systems 100 may subsequently have little to no access to the uplink pathway. In addition, to reduce volume of data transmissions via the uplink pathway, various data reduction techniques (e.g., resulting in highly quantized data) may be implemented to improve efficiency of use of the limited available uplink pathway bandwidth.

In contrast, a downlink pathway facilitating transmissions from data processing system manager 102 to data processing systems 100 may be available due to the increased computing capabilities and/or energy capabilities of data processing system manager 102. Any number of additional pathways may exist (e.g., between data collector 103 and data processing system manager 102, etc.) without departing from embodiments disclosed herein.

While illustrated in FIG. 1 as including a limited number of specific components, a system in accordance with an embodiment may include fewer, additional, and/or different components than those illustrated therein.

Figure 2A:
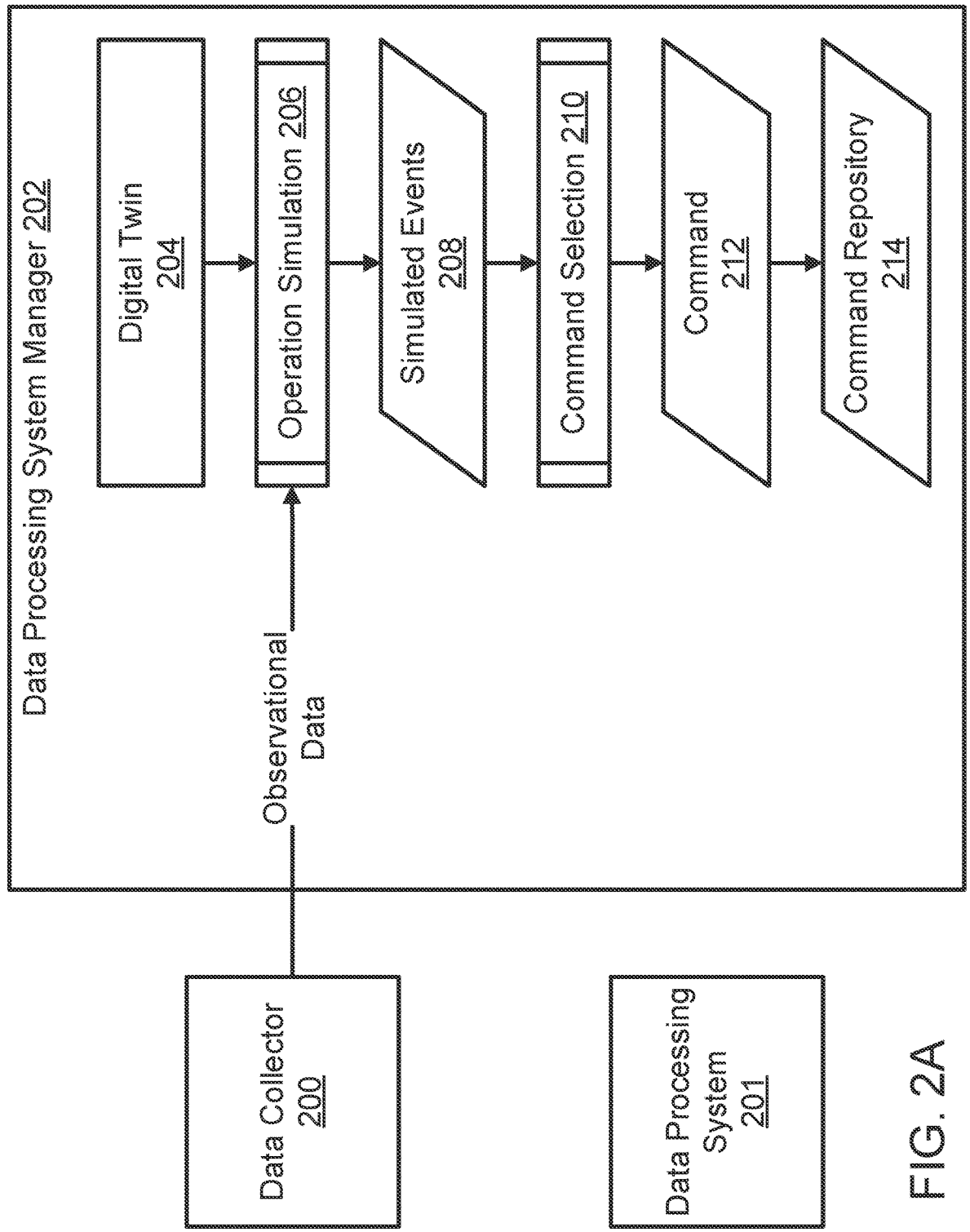
FIG. 2A shows a block diagram illustrating a data processing system manager generating a command repository in accordance with an embodiment.
Figure 2B:
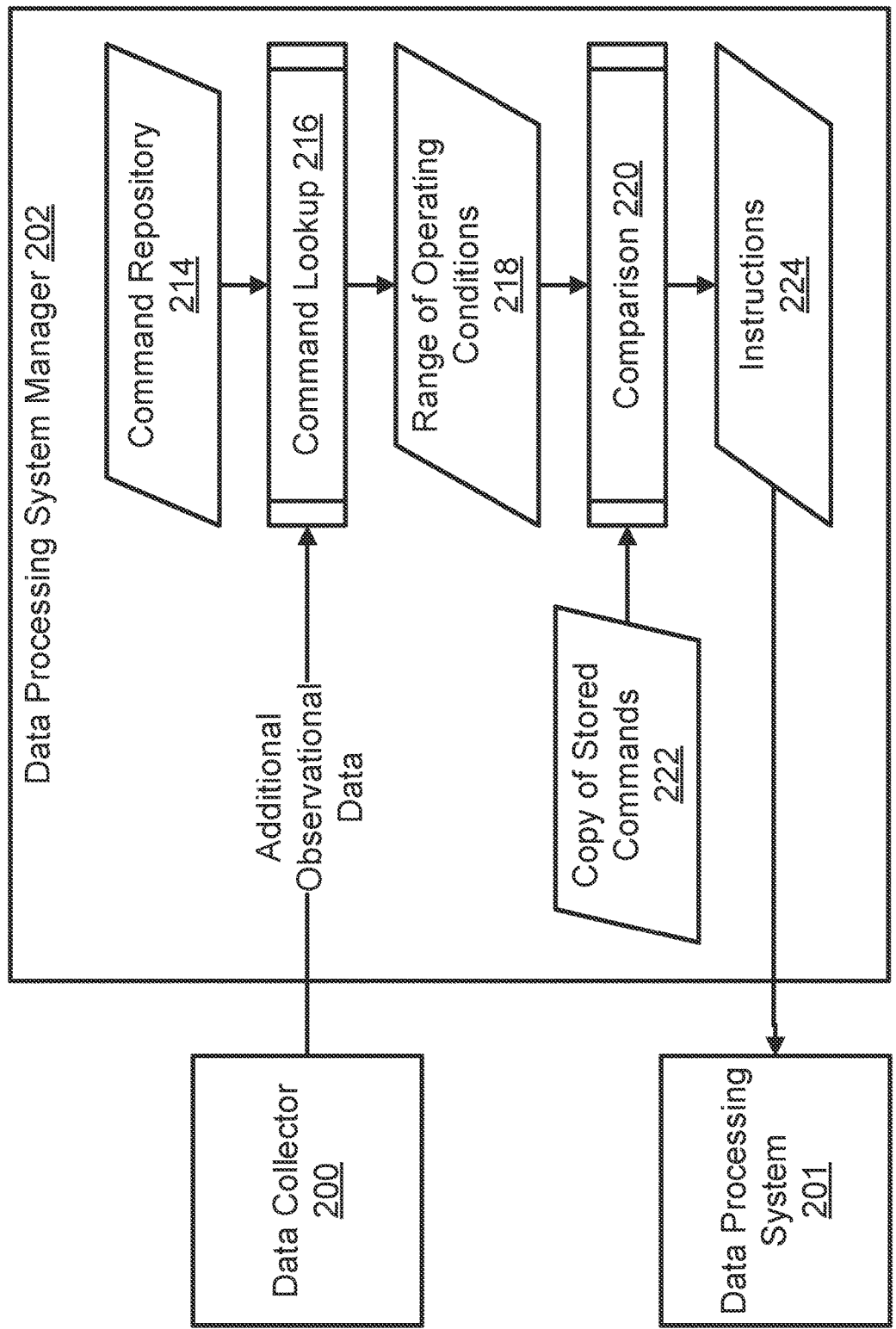
FIG. 2B shows a block diagram illustrating a data processing system manager interacting with a data collector and a data processing system in accordance with an embodiment.

To further clarify embodiments disclosed herein, a diagram illustrating data flows and/or processes performed in a system in accordance with an embodiment is shown in FIGS. 2A-2B.

FIG. 2A shows a block diagram of a data processing system manager generating a command repository in accordance with an embodiment. Data processing system manager 202 may be similar to data processing system manager 102 shown in FIG. 1. Data collector 200 may be similar to data collector 103 shown in FIG. 1 and data processing system 201 may be similar to any of data processing systems 100 shown in FIG. 1.

Data processing system manager 202 may be connected to data collector 200 and data processing system 201 via a communication system (not shown). Communications between data processing system manager 202, data collector 200, and data processing system 201 are illustrated using lines terminating in arrows.

Data processing system 201 may be positioned remote to data collector 200 and data processing system manager 202. In addition, data processing system 201 may have limited (or no) access to an uplink pathway. The uplink pathway may be used to transmit data from data processing system 201 to data processing system manager 202 (and/or other entities) and a downlink pathway may be used to transmit data from data processing system manager 202 (and/or other entities) to data processing system 201.

Therefore, to observe the operation of data processing system 201, data collector 200 (which is located remote to data processing system 201) may have access to a pathway that is not the uplink pathway and may use the pathway to transmit observational data to data processing system manager 202. The observational data may include any data related to the operation of data processing system 201, the environment in which data processing system 201 operates, and/or any other data.

Data processing system manager 202 may perform operation simulation 206 process using the observational data, digital twin 204, and/or other data. Digital twin 204 may include a data structure with instructions to simulate operation of data processing system 201. Data processing system manager 202 may be able to simulate operation of data processing system 201 under a range of possible environmental conditions and/or other scenarios based at least on the observational data. Operation simulation 206 process may also take into account other conditions (e.g., internal conditions, software conditions, etc.).

Operational simulation 206 process may include operating digital twin 204 (e.g., using simulated data, etc.) under simulated environmental and operational conditions based on the observational data (and/or other data as previously described) to obtain simulated events 208. Digital twin 204 may be intended to duplicate operation of data processing system 201 in the environment in which data processing system 201 operates.

Simulated events 208 may include a list of potential future occurrences of events that may impact operation of data processing system 201. Impacting the operation of data processing system 201 may include causing a departure from nominal operation of data processing system 201.

Data processing system manager 202 may perform command selection 210 process using simulated events 208 (e.g., one event, multiple events, etc.) and/or other parameters (e.g., criticality of simulated events 208 and/or other potential events) to obtain command 212. Command selection 210 process may include identifying an action that when performed by data processing system 201 may mitigate the impact of a future occurrence of an event of simulated events 208. Command selection 210 process may also include identifying one or more events with a high level of criticality (e.g., an event that may significantly impact operation of data processing system 201). Events with a high level of criticality may or may not have a high likelihood of occurring in the future but may be included in command 212 to provide data processing system 201 with means to mitigate the impact of the events with a high level of criticality. Command selection 210 process may be performed via a process that data processing system 201 is incapable of performing due to insufficient access to computing resources.

Command 212 may include any number of commands that may be intended to be performed by data processing system 201 prior to the future occurrences of the events and/or concurrently with the future occurrences of the events. Command 212 may be encapsulated in a data structure (e.g., a record). The record (not shown) may also include the operating conditions associated with command 212 and/or other data. Therefore, the record may include instructions to perform a series of actions, a schedule for performing the series of actions, indicators for trigger conditions for performing the series of actions, etc.

Data processing system manager 202 may add the record to command repository 214. Over time, data processing system manager 202 may store any number of records in command repository 214 and command repository 214 may be updated as additional future occurrences of events that are likely to occur and that will impact the operation of the data processing system are identified using digital twin 204.

Command repository 214 may include pre-defined actions responsive to each operating condition of a range of operating conditions, the range of operating conditions including all of the operating conditions in command repository 214. The operating conditions of the range of the operating conditions may be simulated (as previously described) using digital twin 204. In addition, the records stored in command repository 214 be arranged in a lookup table, the lookup table allowing for identification of commands corresponding to operating conditions.

Turning to FIG. 2B, following generation of command repository 214, data processing system manager 202 may use additional observational data obtained from data collector 200 (the additional observational data being obtained after the processes shown in FIG. 2A) and command repository 214 to determine whether to update a cache hosted by data processing system 201.

The additional observational data may indicate environmental conditions encountered by data processing system 201 during a first duration of time. Data processing system manager 202 may utilize the additional observational data and/or other data (e.g., internal data, software data, etc.) to obtain likely future operating conditions (not shown) for data processing system 201. The likely future operating conditions may indicate events that are likely to occur during a second duration of time, the second duration of time being after the first duration of time. Data processing system manager 202 may then perform command lookup 216 process using the likely future operating conditions and command repository 214.

Command lookup 216 process may include utilizing the likely future operating conditions, criticality of events associated with potential future operating conditions, and/or other parameters as a key for a lookup table included in command repository 214 and obtaining a first set of commands (not shown) as output from the lookup table. The first set of the commands may include commands responsive to range of operating conditions 218. Range of operating conditions 218 may include, for example, the likely future operating conditions.

Data processing system manager 202 may perform comparison 220 process using range of operating conditions 218 and copy of stored commands 222 to determine whether range of operating conditions 218 match operating conditions to which commands of copy of stored commands 222 are responsive. Copy of stored commands 222 may include a copy of records (e.g., commands and corresponding operating conditions) currently stored in a cache maintained by data processing system 201.

If range of operating conditions 218 does not match the range of operating conditions associated with copy of stored commands 222 within a threshold, data processing system manager 202 may generate instructions 224. The threshold may be based on historic data (not shown) related to a rate of change of the operating conditions of data processing system 201 over time. The threshold may indicate, for example, an acceptable offset between range of operating conditions 218 and the operating conditions associated with commands of copy of stored commands 222. A magnitude of the offset may depend on a capacity of the cache and, therefore, may vary between data processing systems.

Instructions 224 may include directions for data processing system 201 to remove records associated with a subset of the commands stored in the cache, add records associated with at least a portion of range of operating conditions 218, and/or other directions.

In an embodiment, data processing system manager 202 is implemented using a processor adapted to execute computing code stored on a persistent storage that when executed by the processor performs the functionality of data processing system manager 202 discussed throughout this application. The processor may be a hardware processor including circuitry such as, for example, a central processing unit, a processing core, or a microcontroller. The processor may be other types of hardware devices for processing information without departing from embodiments disclosed herein.

Figure 3A:
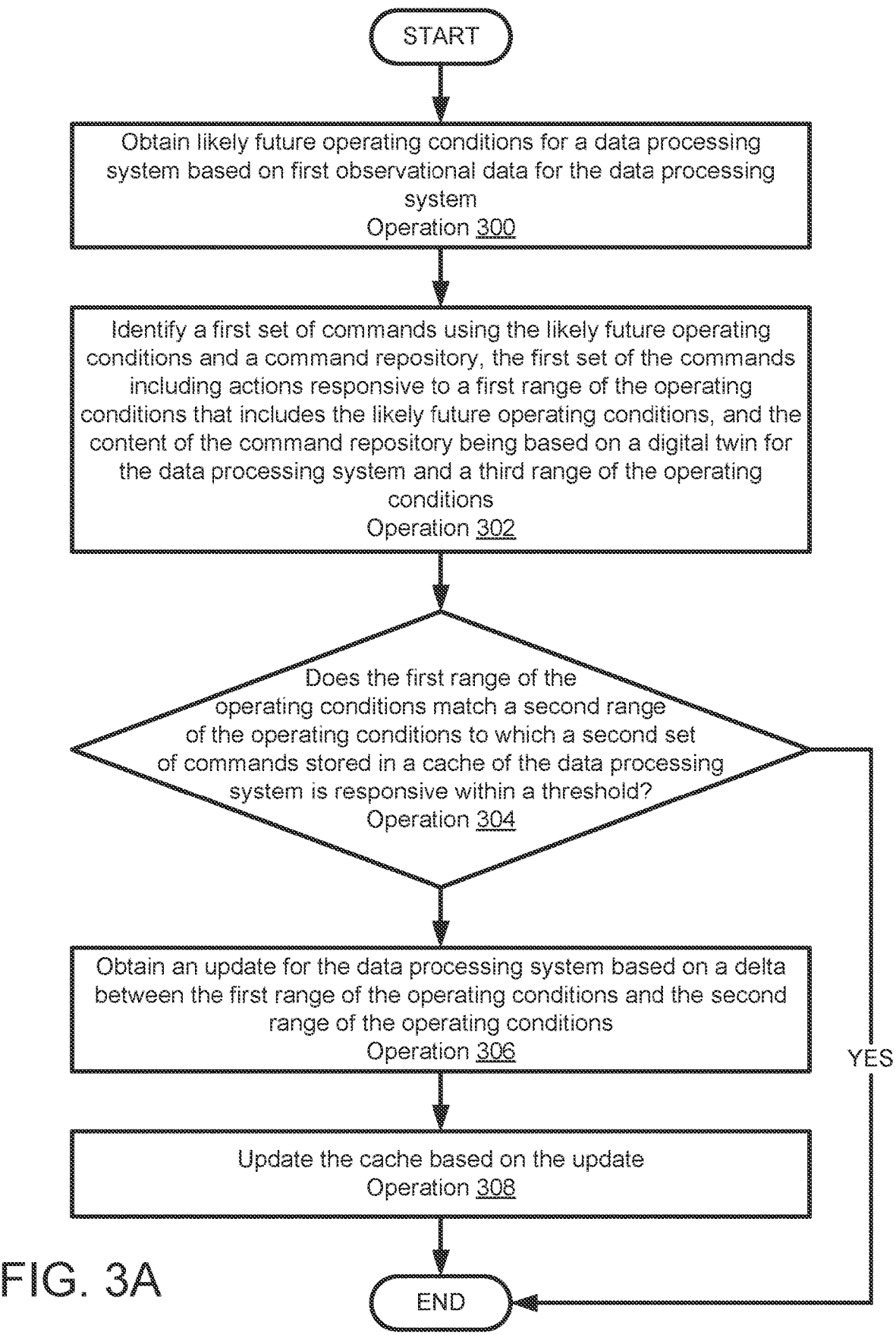
FIG. 3A shows a flow diagram illustrating a method of managing a cache hosted by a data processing system with limited access to an uplink pathway in accordance with an embodiment.
Figure 3B:
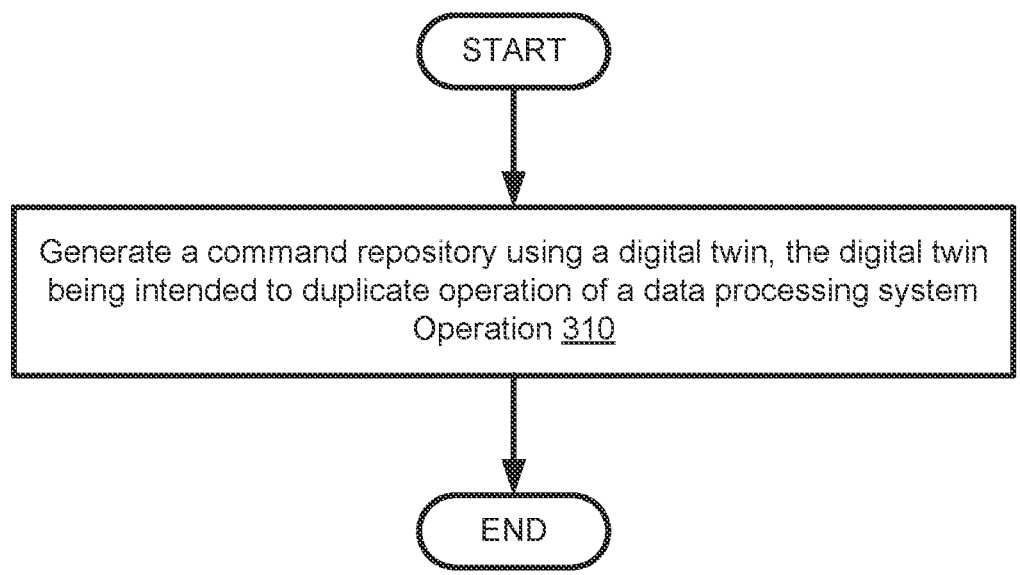
FIG. 3B shows a flow diagram illustrating a method of generating a command repository using a digital twin in accordance with an embodiment.

As discussed above, the components of FIG. 1 may perform various methods to manage operation of data processing systems throughout a distributed environment. FIGS. 3A-3B illustrate methods that may be performed by the components of FIG. 1. In the diagram discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of managing a cache hosted by a data processing system with limited access to an uplink pathway in accordance with an embodiment is shown. The method may be performed, for example, by a data processing system manager, data processing system, and/or any other device.

At operation 300, likely future operating conditions are obtained for a data processing system based at least on first observational data for the data processing system.

Obtaining the likely future operating conditions may include: (i) obtaining the first observational data (and/or other data), and/or (ii) predicting the likely future operating conditions based on the first observational data.

Obtaining the first observational data may include: (i) receiving the first observational data in the form of a message over a communication system (e.g., from a data collector positioned remote to the data processing system), (ii) by accessing a database (locally or offsite) where the first observational data is stored, (iii) by reading the first observational data from storage, and/or other methods. The first observational data may be obtained: (i) according to a schedule indicating regular transmissions of observational data (e.g., once per hour, once per day, etc.), (ii) upon request by an entity for the first observational data, (iii) in response to an event, and/or (iv) by following any other previously determined schedule.

Other data (e.g., internal data, software data, etc.) may be obtained using similar methods to those described above with respect to the first observational data.

Predicting the likely future operating conditions may include feeding the first observational data (and/or the other data) into an inference model (e.g., a neural network) or rules-based engine to predict the likely future operating conditions. The inference model may be trained using at least historical observational data indicating a time series relationship of different aspects of the historical observational data. The likely future operating conditions may be obtained as output from the inference model or rules-based engine The likely future operating conditions may be obtained via other methods including, for example, providing the first observational data and/or the other data to another entity throughout the distributed environment responsible for predicting likely future operating conditions for data processing systems.

At operation 302, a first set of commands is identified using at least the likely future operating conditions and a command repository, the first set of the commands including actions responsive to a first range of the operating conditions that includes the likely future operating conditions, and the content of the command repository being based on a digital twin for the data processing system and a third range of the operating conditions.

The first set of the commands may be identified using at least the likely future operating conditions and a command lookup table, the command lookup table being included in the command repository. The command lookup table may include records, each record of the records including one or more commands corresponding to a range of observational conditions. The likely future operating conditions, criticality of potential events, and/or other data may be treated as a key for the command lookup table and the first set of the commands may be obtained as output from the command lookup table. The first set of the commands may include any number of commands responsive to the likely future operating conditions, any number of commands responsive to events with a certain level of criticality, etc. Refer to FIG. 3B for additional details regarding the command repository.

The first set of the commands may be identified via other means such as: (i) reading the first set of the commands from storage, (ii) providing at least the likely future operating conditions to another entity and requesting the first set of the commands as a response to the provided likely future operating conditions, etc. without departing from embodiments disclosed herein.

At operation 304, it is determined whether the first range of the operating conditions matches a second range of the operating conditions to which a second set of commands stored in a cache of the data processing system is responsive within a threshold.

Determining whether the first range of the operating conditions matches the second range of the operating conditions within the threshold may include: (i) obtaining the second range of the operating conditions, (ii) obtaining the threshold, (iii) obtaining a difference between the first range of the operating conditions and the second range of the operating conditions, and/or (iv) comparing the difference to the threshold.

Obtaining the second range of the operating conditions may include: (i) reading the second range of the operating conditions from storage, (ii) requesting the second range of the operating conditions from another entity, and/or (iii) other methods.

Reading the second range of the operating conditions from storage may include accessing a data structure including a copy of the content of a cache hosted by the data processing system. The data structure may include a list of records that is substantially identical to the list of records stored in the cache. Each record of the list of the records may include a command and a range of operating conditions associated with that command. Therefore, the second range of the operating conditions may be obtained by identifying all operating conditions included in the copy of the cache.

Obtaining the threshold may include: (i) reading the threshold from storage, (ii) requesting the threshold from another entity responsible for generating and/or storing thresholds, (iii) generating the threshold, and/or (iv) other methods.

The threshold may be generated based on: (i) a rate of change of the operating conditions of the data processing system over time using historical observational data, (ii) a capacity of the cache of the data processing system, and/or (iii) other parameters.

Generating the threshold may include feeding the rate of change of the operating conditions of the data processing system, the capacity of the cache, and/or the other parameters into an inference model or rules-based engine trained to identify thresholds.

Obtaining the difference may include: (i) obtaining a first numerical representation of the first range of the operating conditions, (ii) obtaining a second numerical representation of the second range of the operating conditions, and/or (iii) performing a subtraction operation using the first numerical representation and the second numerical representation.

Comparing the difference to the threshold may include: (i) obtaining a numerical representation of an acceptable offset from the threshold, and/or (ii) comparing the numerical representation of the acceptable offset to a numerical representation of the difference.

It may be determined whether the first range of the operating conditions matches the second range of the operating conditions within the threshold via other methods and/or using other representations of the ranges, difference, and/or threshold other than the previously mentioned numerical representations without departing from embodiments disclosed herein.

If the first range of the operating conditions matches the second range of the operating conditions within the threshold, the method may end following operation 304.

If the first range of the operating conditions does not match the second range of the operating conditions within the threshold, the method may proceed to operation 306.

At operation 306, an update for the data processing system is obtained based on a delta between the first range of the operating conditions and the second range of the operating conditions.

Obtaining the update may include: (i) identifying a subset of the second set of the commands based on the delta, (ii) identifying at least a portion of the first set of the commands based on the delta, and/or (iii) generating an instruction to remove records associated with the subset of the second set of the commands from the cache and add records associated with the at least the portion of the first set of the commands to the cache.

The subset of the second set of the commands may include a portion of the records included in the copy of the cache that do not match the first set of the commands and that exceed the capacity of the cache when added to the first set of the commands. The subset of the second set of the commands may include any number of commands (e.g., one command, all commands in the copy of the cache, etc.). Identifying the subset of the second set of the commands may include: (i) reading the subset of the second set of the commands from storage, (ii) requesting the subset of the second set of the commands from another entity, and/or (iii) other methods.

The at least the portion of the first set of the commands may include a portion of the first set of the commands that do not match records included in the copy of the cache. Identifying the at least the portion of the first set of the commands based on the delta may include: (i) reading the at least the portion of the first set of the commands from storage, (ii) requesting the at least the portion of the first set of the commands from another entity, and/or (iii) other methods.

Generating the instruction may include: (i) reading the instruction from storage, (ii) compiling directions for updating the cache using the subset of the second set of the commands and the at least the portion of the first set of the commands into a message, (iii) requesting the instructions from another entity, and/or (iv) other methods. The instructions may be compiled by feeding the first set of the commands (or the at least the portion of the first set of the commands) and the second set of the commands (or the subset of the second set of the commands) into an inference model or other rules-based engine trained to generate the instructions.

At operation 308, the cache is updated based on the update.

Updating the cache may include: (i) providing the instructions to the data processing system in the form of a message over a communication system, (ii) transmitting access credentials to the data processing system, the access credentials allowing the data processing system to access a database including the instructions, (iii) requesting another entity provide the instructions to the data processing system, and/or (iv) modifying the data structure associated with the copy of the cache based on the instructions.

The method may end following operation 308.

Turning to FIG. 3B, a flow diagram illustrating a method of generating a command repository in accordance with an embodiment is shown. The method may be performed, for example, by a data processing system manager, data processing system, and/or any other device. The operations shown in FIG. 3B may be performed prior to the operations shown in FIG. 3A and/or may be repeated as necessary over time during and/or after the operations shown in FIG. 3A.

At operation 310, a command repository is generated using a digital twin, the digital twin being intended to duplicate operation of a data processing system.

Generating the command repository may include: (i) obtaining a third range of the operating conditions based on at least second observational data, (ii) simulating operation of the data processing system using the third range of the operating conditions and the digital twin, (iii) identifying, based on the simulated operation, future occurrences of events that are likely to occur and that will impact the operation of the data processing system (and/or events with a certain level of criticality), (iv) selecting a command for performance by the data processing system for each future event of the future occurrences of the events, (v) generating a record associated with each command, and/or (vi) populating the command repository with the records.

The third range of the operating conditions may include all observed and/or predicted operating conditions associated with the data processing system. Obtaining the third range of the operating conditions may include: (i) obtaining the second observational data, (ii) predicting the third range of the operating conditions based on the second observational data (and/or other data).

Obtaining the second observational data may include: (i) receiving the second observational data in the form of a message over a communication system (e.g., from a data collector positioned remote to the data processing system), (ii) by accessing a database (locally or offsite) where the second observational data is stored, (iii) by reading the second observational data from storage, and/or other methods. The second observational data may be obtained over time, according to a schedule indicating regular transmissions of observational data (e.g., once per hour, once per day, etc.), upon request by an entity for the second observational data, in response to an event, and/or by following any other previously determined schedule.

Predicting the third range of the operating conditions may include feeding the second observational data (and/or other data including, for example, software data) into an inference model (e.g., a neural network and/or any other type of inference model) or rules-based engine to predict the third range of the operating conditions. The inference model may be trained using historical observational data indicating a time series relationship of different aspects of the historical observational data and/or other historical data. The third range of the operating conditions may be obtained as output from the inference model or rules-based engine The third range of the operating conditions may be obtained via other methods including, for example, providing at least the second observational data to another entity throughout the distributed system responsible for predicting operating conditions for data processing systems.

Simulating the operation of the data processing system may include: (i) obtaining the digital twin of the data processing system, and/or (ii) performing a simulation of operation of the data processing system using the digital twin.

The digital twin may be obtained by: (i) reading the digital twin from storage, (ii) obtaining the digital twin from an entity responsible for generating and/or managing digital twins, (iii) by generating the digital twin (e.g., by obtaining a copy of software executed by the data processing system to perform computer-implemented services), and/or (iv) via other methods. Obtaining the digital twin may also include utilizing the observational data (and/or historical observational data) to establish parameters of the digital twin to simulate operation of the data processing system under certain environmental conditions.

Performing the simulation of the operation of the data processing system may include: (i) obtaining input data for the digital twin, and/or (ii) performing computations using the digital twin and the input data to simulate operation of the data processing system.

The input data may be obtained by: (i) reading the input data from storage, (ii) simulating the input data using an inference model (e.g., a neural network, etc.), (iii) requesting the input data from another entity throughout the distributed environment, and/or (iv) other methods.

Performing the computations using the digital twin and the input data may include feeding the input data into the digital twin and obtaining a simulated output, the simulated output being intended to match an output generated by the data processing system.

The computations may also be performed by providing the input data to another entity responsible for hosting and operating the digital twin and receiving the simulated output in response from the entity.

Following performing the simulation, characteristics of the simulated operation may be identified, entered into a data structure, and stored in storage for future use.

Identifying the future occurrence of the event may include: (i) obtaining the characteristics of the simulated operation, (ii) identifying a portion of the simulated operation, based on the characteristics, in which the simulated operation departs from nominal operating conditions.

The characteristics of the simulated operation may be obtained by: (i) reading the characteristics of the simulated operation from storage, (ii) requesting the characteristics of the simulated operation from another entity responsible for storing the characteristics of the simulated operation, and/or (iii) generating the characteristics of the simulated operation.

The characteristics may include, for example: (i) raw and/or processed simulated data, (ii) computations performed during the simulated operation, (iii) statistics related to the computations performed during the simulated operation (e.g., rates of computations performed, accuracy of computations performed, etc.), and/or other characteristics.

The portion of the simulated operation may be identified by: (i) generating a data structure including a time series relationship for a characteristic of the simulated operation (e.g., a rate of operation over time, an accuracy of computations over time), (ii) comparing the time series relationship for the characteristic of the simulated operation to a representation of nominal operation of the data processing system (e.g., a time series relationship for a corresponding characteristic of the nominal operation of the data processing system), and/or (iii) identifying a timestamp associated with a portion of the time series relationship for the characteristic of the simulated operation that does not match the representation of the nominal operation within a threshold as the event.

The portion of the simulated operation may also be identified by: (i) requesting another entity identify and provide the portion, (ii) by reading the portion from storage, and/or (iii) other methods.

Selecting the command for performance by the data processing system may include performing a lookup process using a command lookup table and an identifier of the event as a key for the command lookup table. Performing the lookup process may include inputting the identifier as the key for the command lookup table and obtaining one or more commands as output from the command lookup table.

Selecting the command may also include: (i) re-simulating the operation of the data processing system using the observational data, the digital twin, and the command, and/or (ii) identifying, based on the re-simulated operation, that the future occurrence of the event is unlikely to occur.

Re-simulating the operation of the data processing system may include operating the digital twin as previously described with the addition of the command, the command instructing the digital twin to perform an action set in response to certain conditions being met with the intention of avoiding and/or remediating an impact of the future occurrence of the event.

Identifying that the future occurrence of the event is unlikely to occur may include monitoring characteristics (e.g., the previously mentioned time series relationship and/or other characteristics) of the re-simulated operation and comparing the characteristics of the re-simulated operation to the representation of the nominal operation as previously described.

Identifying that the future occurrence of the event is unlikely to occur may also include failing to identify the event during the comparison of characteristics of the re-simulated operation to the representation of the nominal operation.

Generating the record may include: (i) encapsulating the command and the operational conditions associated with the command in a data structure, (ii) transmitting the command and the operational conditions associated with the command to another entity responsible for generating records, (iii) feeding the command and the observational conditions associated with the command into an inference model trained to generate records, and/or (iv) other methods.

Populating the command repository with the records may include: (i) initiating a storage command to add the record to the command repository, (ii) providing instructions to another entity to add the records to the command repository, and/or (iii) other methods.

The method may end following operation 310.

Figure 4A:
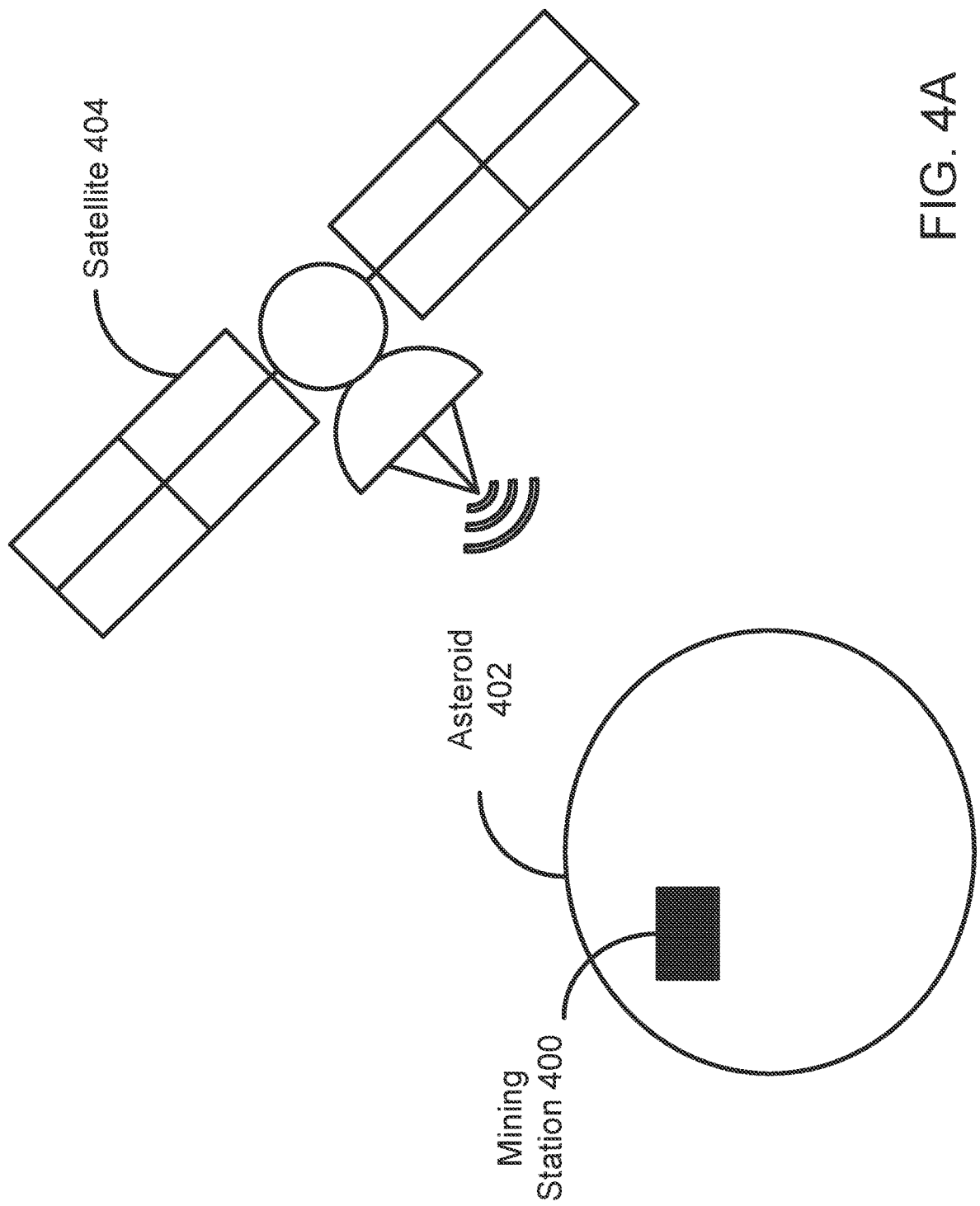
Figure 4B:
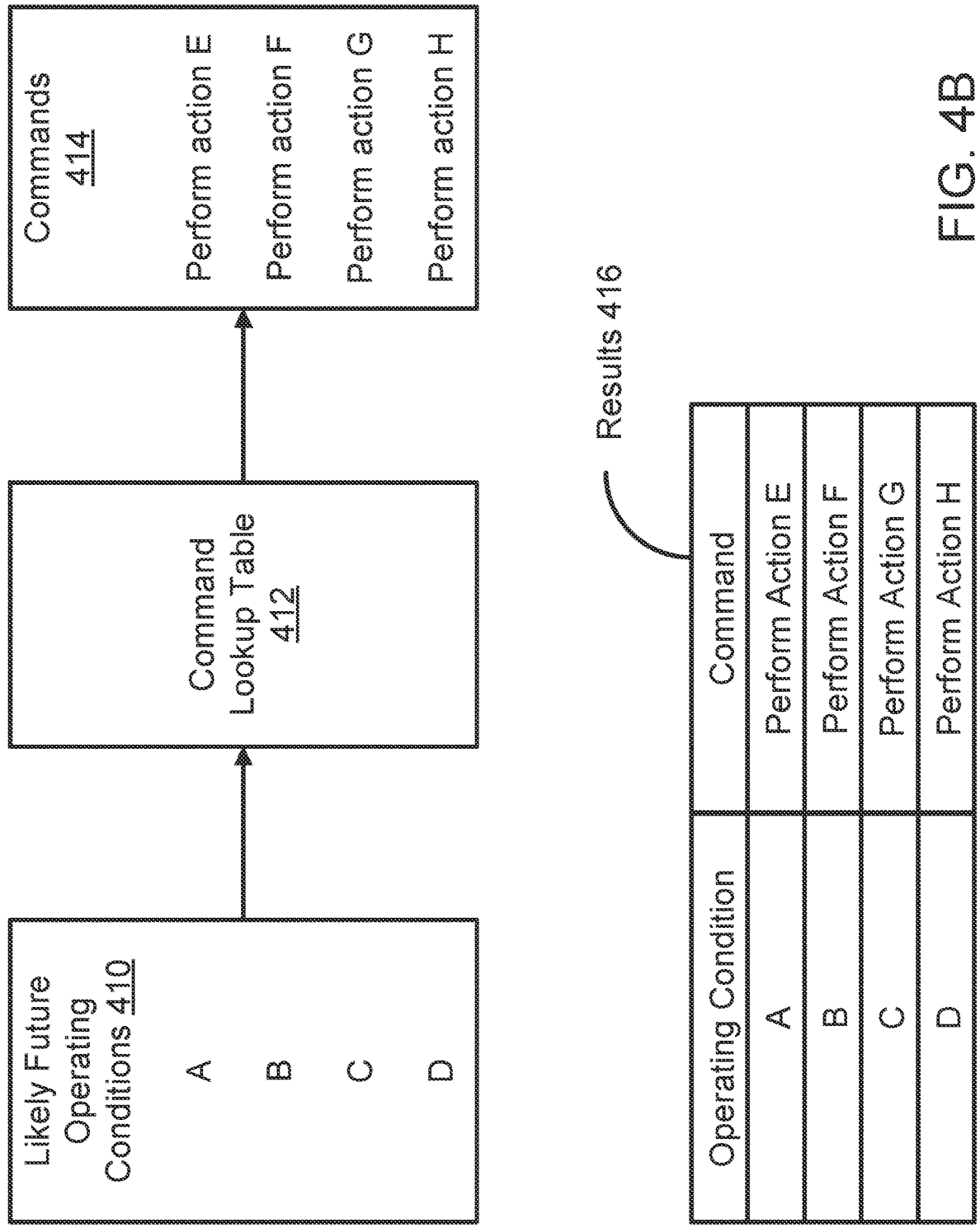

Turning to FIGS. 4A-4C, these figures may illustrate a system similar to that of FIG. 1 in accordance with an embodiment. FIGS. 4A-4C may show actions performed by the system over time. The system may include a mining station similar to any of data processing system 100 in FIG. 1, a satellite similar to data collector 103 in FIG. 1, and a mining station manager similar to data processing system manager 102 in FIG. 1.

Turning to FIG. 4A, mining station 400 may manage operation of a mining system positioned on asteroid 402. Mining station 400 may have limited access to an uplink communication pathway. However, satellite 404 (e.g., the data collector) may be positioned to collect observational data related to the operation of mining station 400 on asteroid 402 and may provide the observational data to the data processing system manager. The observational data may include, for example, the frequency of solar flares and perceived changes in the efficiency of mining station 400 during and after occurrences of the solar flares.

Turning to FIG. 4B, the data processing system manager (not shown) may utilize the observational data to generate likely future operating conditions 410 using an inference model. Likely future operating conditions 410 may include a series of events that are likely to occur and may impact operation of the mining device (e.g., upcoming solar flares, etc.).

Likely future operating conditions 410 may be treated as a key for command lookup table 412 to identify previously generated commands responsive to the events included in likely future operating conditions 410. Command lookup table 412 may generate commands 414 as output, commands 414 including an action responsive to each operating condition of likely future operating conditions 410. As a result, data processing system manager may generate results 416. Results 416 may include a list of results, each result of the list of the results including an operating condition from likely future operating conditions 410 and a corresponding command from commands 414.

Turning to FIG. 4C, the data processing system manager may compare results 416 to copy of cache 418 to determine whether to initiate an update to the cache hosted by mining station 400. Copy of cache 418 may include a substantially identical list of results as those stored by mining station 400. Using threshold 420, data processing system manager may initiate an update to the cache if results 416 have less than 75% similarity to copy of cache 418.

In FIG. 4C, results 416 have less than 75% similarity to copy of cache 418 and, therefore, the data processing system manager may generate instructions 422. Instructions 422 may include directions for mining station 400 to update the cache in order to include commands most likely to be relevant to likely future events to be encountered by mining station 400.

The data processing system manager may provide instructions 422 to mining station 400 and mining station 400 may implement instructions 422 to obtain updated cache 424. The data processing system manager may also update copy of cache 418 to reflect instructions 422.

Figure 5:
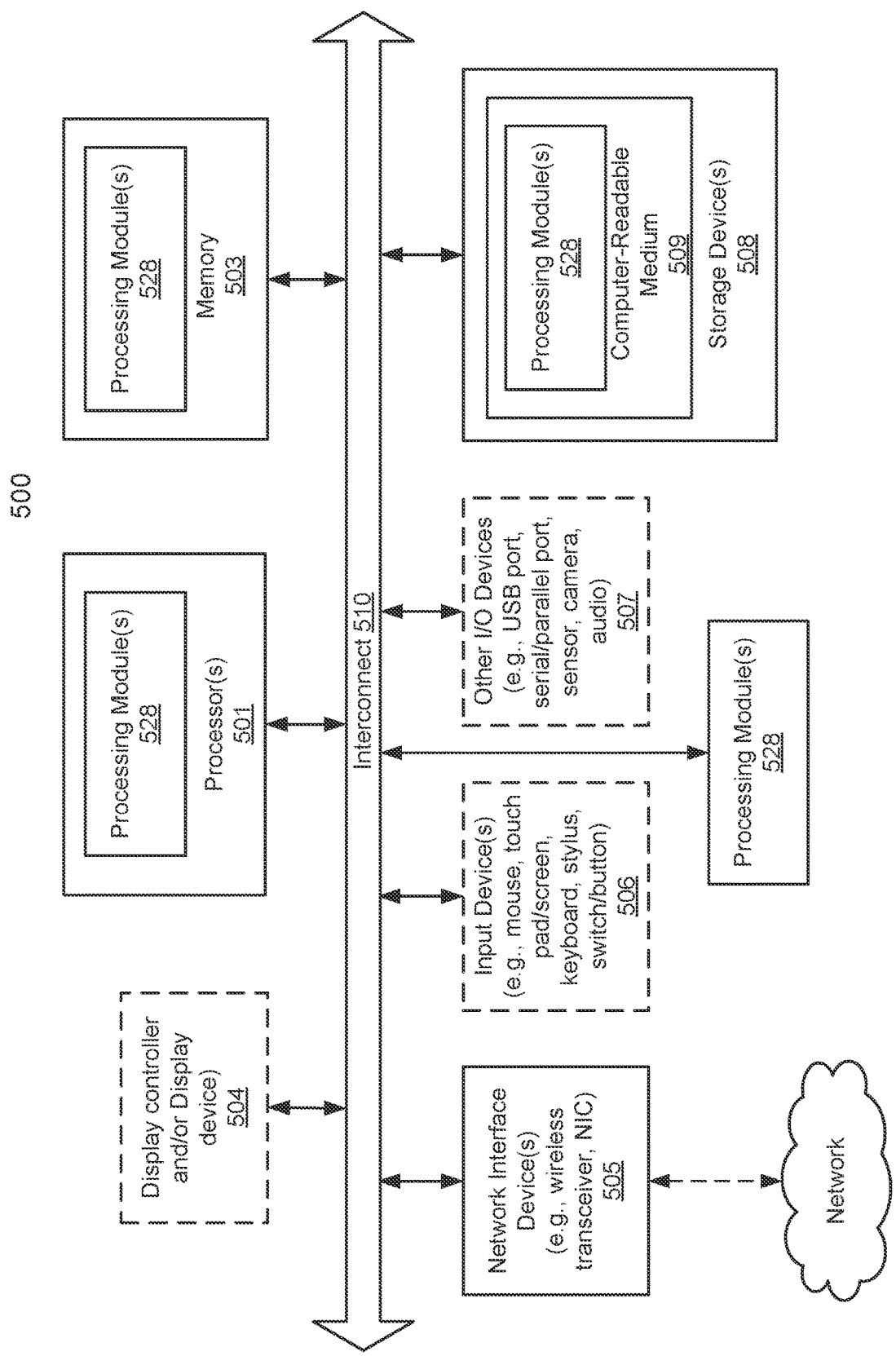
FIG. 5 shows a block diagram illustrating a data processing system in accordance with an embodiment.

Any of the components illustrated in FIGS. 1-4C may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing a data processing system with limited access to an uplink pathway by a data processing system manager, the method comprising:
    obtaining likely future operating conditions for the data processing system based at least on first observational data for the data processing system, the first observational data indicating environmental conditions encountered by the data processing system during a first duration of time;
    identifying a first set of commands using at least the likely future operating conditions and a command repository, the first set of commands comprising actions responsive to a first range of operating conditions that comprises the likely future operating conditions, and content of the command repository being based on a digital twin for the data processing system and a third range of operating conditions;
    making a determination regarding whether the first range of the operating conditions matches a second range of operating conditions to which a second set of commands stored in a cache of the data processing system is responsive within a threshold;
    in a first instance of the determination in which the first range of the operating conditions does not match the second range of the operating conditions within the threshold:
        obtaining an update for the data processing system based on a delta between the first range of the operating conditions and the second range of the operating conditions; and
        updating the cache based on the update.

2. The method of claim 1, wherein the observational data is obtained from a data collector, the data collector being located remote to the data processing system and being capable of transmitting the observational data via a different pathway from the uplink pathway.

3. The method of claim 1, further comprising:
prior to obtaining the likely future operating conditions:
generating the command repository using the digital twin, the digital twin being intended to duplicate operation of the data processing system.

4. The method of claim 3, wherein generating the command repository comprises:
obtaining the third range of the operating conditions based at least on second observational data;
simulating operation of the data processing system using the third range of the operating conditions and the digital twin;
identifying, based on the simulated operation, future occurrences of events that are likely to occur and that will impact the operation of the data processing system;
selecting a command for performance by the data processing system for each future event of the future occurrences of the events, the command being expected to mitigate impact of the future occurrences of the events when performed by the data processing system;
generating a record associated with each command, the record comprising the command and the operating conditions associated with the command; and
populating the command repository with the records.

5. The method of claim 4, wherein the command repository is updated as additional future occurrences of events that are likely to occur and that will impact the operation of the data processing system are identified using the digital twin.

6. The method of claim 5, wherein the third range of the operating conditions comprises all of the operating conditions in the command repository.

7. The method of claim 6, wherein the operating conditions of the third range of the operating conditions are simulated using the digital twin and the command repository comprises pre-defined actions responsive to each operating condition of the third range of the operating conditions.

8. The method of claim 1, wherein the threshold is based on historic data related to a rate of change of the operating conditions of the data processing system over time.

9. The method of claim 8, wherein the threshold indicates an acceptable offset between the first set of the operating conditions and the second set of the operating conditions, and a magnitude of the offset is dependent on a capacity of the cache.

10. The method of claim 1, wherein obtaining the update comprises:
identifying a subset of the second set of the commands based on the delta;
identifying at least a portion of the first set of the commands based on the delta;
generating an instruction to:
remove records associated with the subset of the second set of the commands from the cache; and
add records associated with the at least the portion of the first set of the commands to the cache.

11. A non-transitory machine-readable medium having instructions stored therein, which when executed by a processor, cause the processor to perform operations for managing a data processing system with limited access to an uplink pathway by a data processing system manager, the operations comprising:
obtaining likely future operating conditions for the data processing system based at least on first observational data for the data processing system, the first observational data indicating environmental conditions encountered by the data processing system during a first duration of time;
identifying a first set of commands using at least the likely future operating conditions and a command repository, the first set of commands comprising actions responsive to a first range of operating conditions that comprises the likely future operating conditions, and content of the command repository being based on a digital twin for the data processing system and a third range of operating conditions;
making a determination regarding whether the first range of the operating conditions matches a second range of operating conditions to which a second set of commands stored in a cache of the data processing system is responsive within a threshold;
in a first instance of the determination in which the first range of the operating conditions does not match the second range of the operating conditions within the threshold:
obtaining an update for the data processing system based on a delta between the first range of the operating conditions and the second range of the operating conditions; and
updating the cache based on the update.

12. The non-transitory machine-readable medium of claim 11, wherein the observational data is obtained from a data collector, the data collector being located remote to the data processing system and being capable of transmitting the observational data via a different pathway from the uplink pathway.

13. The non-transitory machine-readable medium of claim 11, wherein the operations further comprise:
prior to obtaining the likely future operating conditions:
generating the command repository using the digital twin, the digital twin being intended to duplicate operation of the data processing system.

14. The non-transitory machine-readable medium of claim 13, wherein generating the command repository comprises:
obtaining the third range of the operating conditions based at least on second observational data;
simulating operation of the data processing system using the third range of the operating conditions and the digital twin;
identifying, based on the simulated operation, future occurrences of events that are likely to occur and that will impact the operation of the data processing system;
selecting a command for performance by the data processing system for each future event of the future occurrences of the events, the command being expected to mitigate impact of the future occurrences of the events when performed by the data processing system;
generating a record associated with each command, the record comprising the command and the operating conditions associated with the command; and
populating the command repository with the records.

15. The non-transitory machine-readable medium of claim 14, wherein the command repository is updated as additional future occurrences of events that are likely to occur and that will impact the operation of the data processing system are identified using the digital twin.

16. A data processing system, comprising:
a processor; and
a memory coupled to the processor to store instructions, which when executed by the processor, cause the processor to perform operations for managing a data processing system with limited access to an uplink pathway by a data processing system manager, the operations comprising:

obtaining likely future operating conditions for the data processing system based at least on first observational data for the data processing system, the first observational data indicating environmental conditions encountered by the data processing system during a first duration of time;

identifying a first set of commands using at least the likely future operating conditions and a command repository, the first set of commands comprising actions responsive to a first range of operating conditions that comprises the likely future operating conditions, and content of the command repository being based on a digital twin for the data processing system and a third range of operating conditions;

making a determination regarding whether the first range of the operating conditions matches a second range of operating conditions to which a second set of commands stored in a cache of the data processing system is responsive within a threshold;

in a first instance of the determination in which the first range of the operating conditions does not match the second range of the operating conditions within the threshold:

obtaining an update for the data processing system based on a delta between the first range of the operating conditions and the second range of the operating conditions; and updating the cache based on the update.

17. The data processing system of claim 16, wherein the observational data is obtained from a data collector, the data collector being located remote to the data processing system and being capable of transmitting the observational data via a different pathway from the uplink pathway.

18. The data processing system of claim 16, wherein the operations further comprise:

prior to obtaining the likely future operating conditions:
generating the command repository using the digital twin, the digital twin being intended to duplicate operation of the data processing system.

19. The data processing system of claim 18, wherein generating the command repository comprises:

obtaining the third range of the operating conditions based at least on second observational data;

simulating operation of the data processing system using the third range of the operating conditions and the digital twin;

identifying, based on the simulated operation, future occurrences of events that are likely to occur and that will impact the operation of the data processing system;

selecting a command for performance by the data processing system for each future event of the future occurrences of the events, the command being expected to mitigate impact of the future occurrences of the events when performed by the data processing system;

generating a record associated with each command, the record comprising the command and the operating conditions associated with the command; and populating the command repository with the records.

20. The data processing system of claim 19, wherein the command repository is updated as additional future occurrences of events that are likely to occur and that will impact the operation of the data processing system are identified using the digital twin.

* * * * *